H. N. GREEN.
Horse Hay-Rake.
No. 109,509. Patented Nov. 22, 1870.
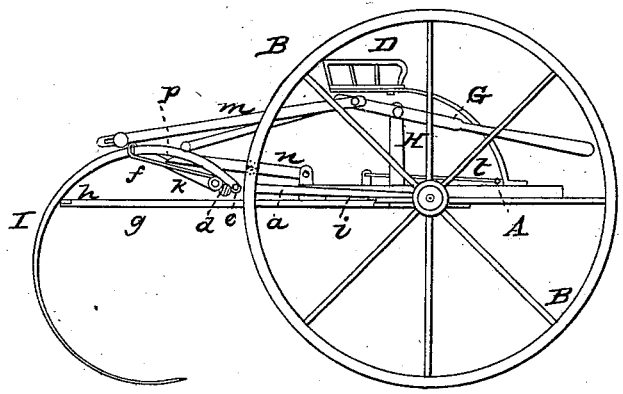
Fig. 1.
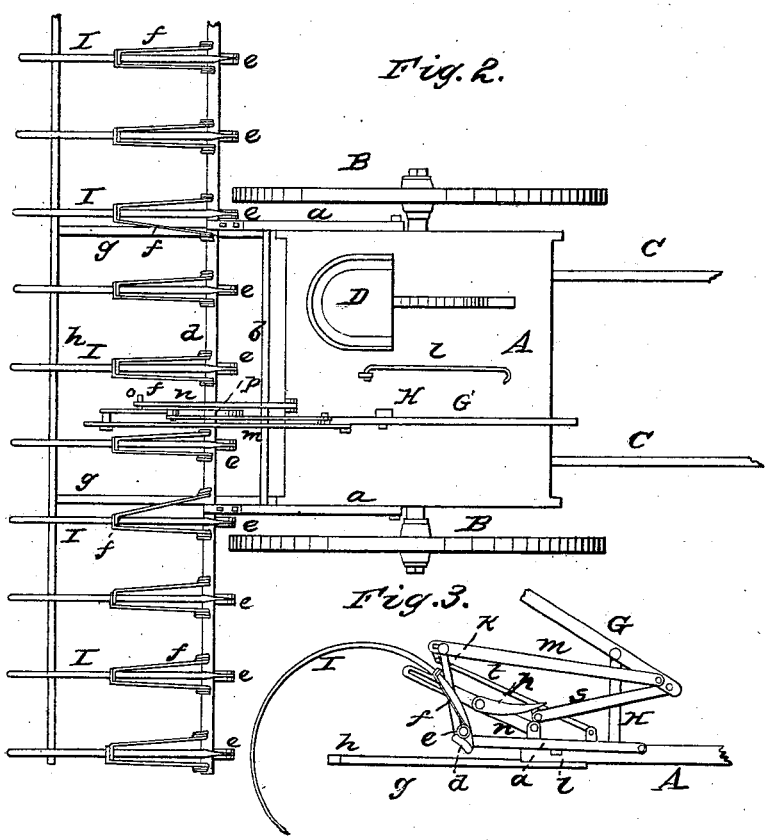
Fig. 2.
Fig. 3.
Witnesses:
C. L. Evert
P. E. Hutchinson
Inventor.
Henry N. Green.
per
Alexander Mason

UNITED STATES PATENT OFFICE.

HENRY N. GREEN, OF FORT WAYNE, INDIANA.

IMPROVEMENT IN HORSE HAY-RAKES.

Specification forming part of Letters Patent No. 109,509, dated November 22, 1870.

*To all whom it may concern:*

Be it known that I, HENRY N. GREEN, of Fort Wayne, in the county of Allen, and in the State of Indiana, have invented certain new and useful Improvements in Sulky Horse Hay-Rakes; and do hereby declare that the following is a full, clear, and exact description thereof, reference being had to the accompanying drawing, and to the letters of reference marked thereon, making a part of this specification.

The nature of my invention consists in the construction and arrangement of levers for operating a horse hay-rake, as will be hereinafter fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view, of the rake. Fig. 3 is a side view of the lever arrangement whereby the rake is raised and lowered.

The carriage for my rake consists of a narrow platform, A, mounted upon two wheels, B B, and provided with shafts C C, making it a sulky-carriage. The seat D is supported in any suitable manner on the platform A. On each side of the platform A, immediately in rear of the axle, is pivoted an arm, $a$, which extends toward the rear and beyond the platform, resting upon a projection, $i$, in the side of the platform, near the rear end. The arms $a$ $a$ are connected, in rear of the platform A, by means of the rod $b$, and at their outer ends are formed boxes or bearings, in which is placed and revolves the rake-head $d$. This head extends a suitable distance on both sides beyond the wheels, and is provided with a series of sockets, $e$ $e$, in each of which a tooth, I, is pivoted. The teeth I I are made of spring-steel, in the form of a perfect circle, or, rather, a section of a perfect circle. They are further so arranged that their points or ends project under, so as to slide about six or eight inches, or more, of their length along on the ground, instead of scratching along with their points. Each tooth is held in proper position by a spring, $f$, formed of one piece of wire, the center of said wire forming a coil around the teeth, and the ends forming a coil on each side of the tooth and secured to the head. From the under side of the platform A, toward the rear, extend two other arms, $g$ $g$, connected at their outer ends by a rod or bar, $h$, of the same, or about the same, length as the rake-head. When the rake is in operation the teeth I I pass over and rest upon said bar $h$, and when the rake is raised up to deposit the hay this bar acts as a clearer to clear the hay from the teeth.

The rake is raised and lowered by the following means: From the rake-head $d$ projects an arm, $k$, which, by a bar or rod, $m$, is connected with the lower end of the lever G, said lever being pivoted to a standard, H, on the platform A. By this arrangement the rake is raised and lowered by the driver from his seat D.

At the back part of the platform A is pivoted or hinged a bar, $n$, the rear end of which is slotted and reaches back to the arm $k$, where it slides on a pin, $o$, in said arm for holding the rake steady. On this slotted bar $n$ is pivoted a dog or pawl, $p$, which, when the rake is lowered, reaches to and fits in a notch on the arm $k$, to prevent the rake from turning up. This dog or pawl is, by a rod or bar, $s$, connected with the lower end of the lever G, which thus operates the same to place it in or raise it from the notched arm $k$ at the same time as said lever operates the rake. When the rake is turned up it is held by a hook, $t$, which is attached to the platform A, and hooks onto the arm $k$.

Having thus fully described my invention, what I claim as new, and desire to secure by Letters Patent, is—

The arrangement, with the rake $d$ I, of the lever G, rod $m$, arm $k$, bar $n$, pawl $p$, and rod $s$, all substantially as shown and described, and for the purposes set forth.

In testimony that I claim the foregoing I have hereunto set my hand this 8th day of September, 1870.

HENRY N. GREEN.

Witnesses:
H. F. WILLSON,
R. S. ROBERTSON.